United States Patent
Howley

(10) Patent No.: US 7,624,513 B2
(45) Date of Patent: Dec. 1, 2009

(54) SCALE AND READHEAD SYSTEM

(75) Inventor: Colin Keith Howley, Stonehouse (GB)

(73) Assignee: Renishaw PLC, Wotton-Under-Edge (GB)

( * ) Notice: Subject to any disclaimer, the term of this patent is extended or adjusted under 35 U.S.C. 154(b) by 108 days.

(21) Appl. No.: 12/083,531

(22) PCT Filed: Nov. 6, 2006

(86) PCT No.: PCT/GB2006/004122

§ 371 (c)(1),
(2), (4) Date: Apr. 14, 2008

(87) PCT Pub. No.: WO2007/052052

PCT Pub. Date: May 10, 2007

(65) Prior Publication Data

US 2009/0064524 A1 Mar. 12, 2009

(30) Foreign Application Priority Data

Nov. 7, 2005 (GB) ................................. 0522651.9

(51) Int. Cl.
*G01D 5/347* (2006.01)
*G01D 5/36* (2006.01)
(52) U.S. Cl. .......................................... 33/706; 33/707
(58) Field of Classification Search .................... 33/706, 33/707, 708, 702; 356/616, 617, 618, 619; 324/601; 702/72, 94
See application file for complete search history.

(56) References Cited

U.S. PATENT DOCUMENTS 4,168,911 A 9/1979 Pryor
4,449,191 A * 5/1984 Mehnert ........................ 702/94
5,844,814 A 12/1998 Chliwnyj et al.
6,029,363 A * 2/2000 Masreliez et al. ............. 33/706
6,051,971 A * 4/2000 Holden .................... 324/207.24
6,501,262 B1 * 12/2002 Schneeberger et al. ...... 324/206
6,922,907 B2 * 8/2005 Rodi ............................ 33/707
2004/0036016 A1 2/2004 Homer et al.

FOREIGN PATENT DOCUMENTS

| DE | 197 54 595 A1 | | 6/1999 |
|----|---|---|---|
| EP | 0 543 513 A1 | | 5/1993 |
| JP | 56048501 A | * | 5/1981 |
| WO | WO 99/46603 A1 | | 9/1999 |
| WO | WO 02/065061 A1 | | 8/2002 |
| WO | WO 2005124283 A2 | * | 12/2005 |
| WO | WO 2007057645 A1 | * | 5/2007 |

* cited by examiner

*Primary Examiner*—R. A. Smith
(74) *Attorney, Agent, or Firm*—Oliff & Berridge, PLC

(57) ABSTRACT

A method of calibrating a scale measurement apparatus. A scale has scale markings arranged to form an incremental pattern and at least one scale mark. A readhead has an incremental detector means which produces an output signal and a scale mark detector means for producing a signal having a zero crossing. The readhead is moved relative to the scale. The output from the incremental detector is used to determine a predetermined phase in the output signal and the value of the signal from the scale mark detector corresponding to the predetermined phase in the output signal from the incremental detector on either side of the zero crossing is determined. These values are used to define the width of the scale mark pulse.

12 Claims, 5 Drawing Sheets

SCALE AND READHEAD SYSTEM

Figure 1:
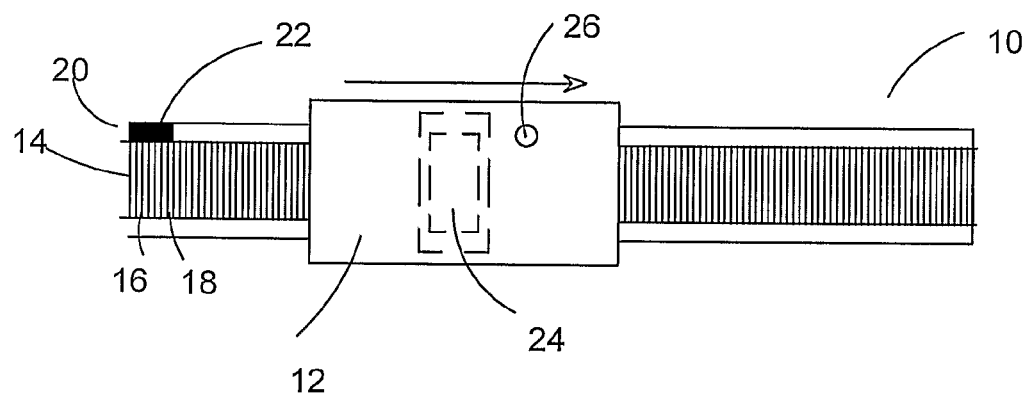

The present invention relates to a scale and readhead system. In particular the invention relates to a scale and readhead system having an incremental channel and reference mark channel. The invention provides apparatus and a method for calibrating the reference mark signal.

A known form of scale reading apparatus for measuring relative displacement of two members comprises a scale on one of the members, having scale marks defining a pattern and a readhead provided on the other member. An optical scale reading apparatus has means for illuminating the scale and detecting means in the readhead responsive to resultant light patterns to produce a measure of relative displacement of the scale and readhead.

A scale having its marks in a periodic pattern is known as an incremental scale and produces a quadrature signal. The scale may be provided with one or more reference marks, which when detected by the readhead enable the exact position of the readhead to be determined. In order for a reference mark signal to be useful, its position with respect to the incremental scale must be known. Thus, the centre and width of the reference mark signal is fixed relative to the incremental scale.

In many systems, it is common for the output differential voltage from the reference mark detector to be provided with upper and lower voltage thresholds a fixed distance apart. A reference mark signal is output when the differential voltage is between these two levels. The reference mark signal is typically phased with respect to the incremental channel by geometrically adjusting the readhead to realign the incremental and reference mark channels with respect to each other. Alternatively, the signals are adjusted electronically to align the incremental and reference mark channels, for example the voltage output from the reference mark detector may be moved relative to the upper and lower voltage thresholds.

This method of using fixed thresholds has several disadvantages. In particular, non-optimal results can occur during calibration if the amplitude of the reference mark signal varies. This is the case where different readhead and scale combinations can result in different system gains. Additionally some measurement systems use the same light source for both the incremental and reference mark channels. In this case the incremental channel is first calibrated to obtain 100% signal strength and this may change the light levels falling on the reference mark detector, which will have the effect of changing the amplitude of the reference mark signal. Such a change in the amplitude of the reference mark signal will have the effect of changing the width of signal between the upper and lower voltage thresholds.

The present invention provides a method for calibrating scale measurement apparatus, said scale apparatus comprising a scale having scale markings arranged to form an incremental pattern and at least one scale mark and wherein the readhead comprises an incremental detector means which produces an output signal and a scale mark detector means for producing a signal having a zero crossing, wherein the method comprises the following steps in any suitable order:
 (a) moving the readhead relative to the scale;
 (b) using the output from the incremental detector to determine a predetermined phase in the output signal;
 (c) using the output from the scale mark detector to determine the zero crossing;
 (d) determining the value of the signal from the scale mark detector corresponding to the predetermined phase in the output signal on either side of the zero crossing; and
 (e) using the values determined in step (d) to define the width of the scale mark pulse.

Preferably the output signal from the incremental detector is a quadrature signal. The phase of the predetermined phase may be an angular position in each quadrature cycle.

Preferably the at least one scale marking is a reference mark. The signal from the scale mark detector may be a voltage signal, preferably a difference voltage signal. The scale mark detector may be a split detector (bi-cell).

Preferably the outputs from the scale mark detector which correspond to the predetermined phase in the output signal from the incremental detector are stored, e.g. in memory. The previous output stored may be overwritten by a subsequent output corresponding to the predetermined phase in the output signal from the incremental detector if no zero crossing is detected between the previous and subsequent outputs. The previous output stored may not be overwritten by a subsequent output corresponding to the predetermined phase in the output signal from the incremental detector if a zero crossing is detected between the previous and subsequent outputs.

Preferably the values determined in step (d) are used to define the centre of the scale mark pulse.

Scale and readhead systems are not limited to optical systems. Other systems are known, for example magnetic, capacitance or inductance scale reading systems.

This calibration method is suitable for use with linear, rotary and two-dimensional scales.

Figure 2:
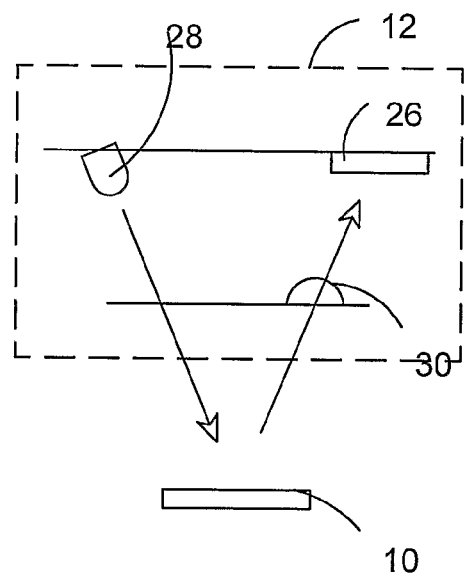
Figure 3:
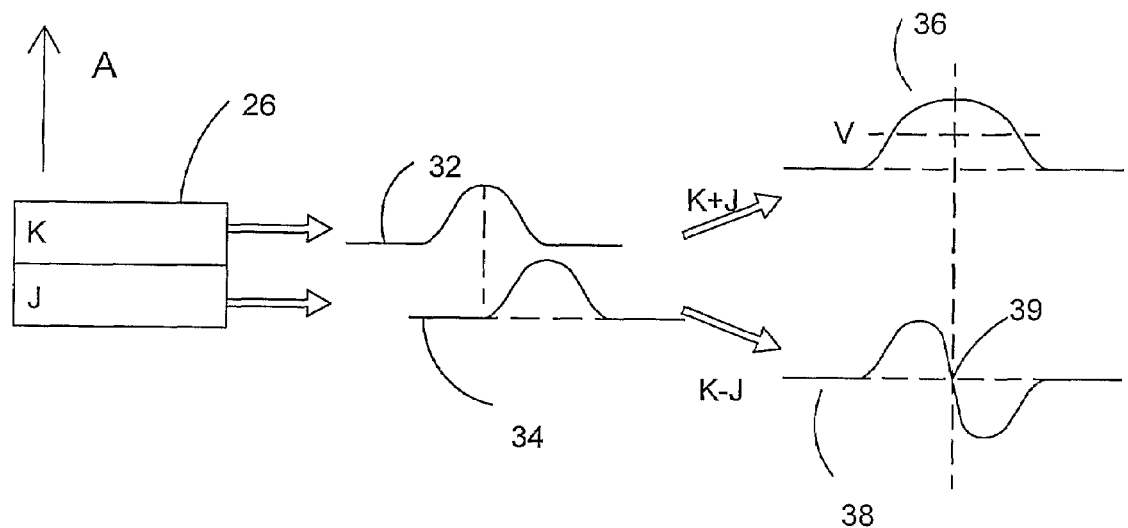
Figure 4:
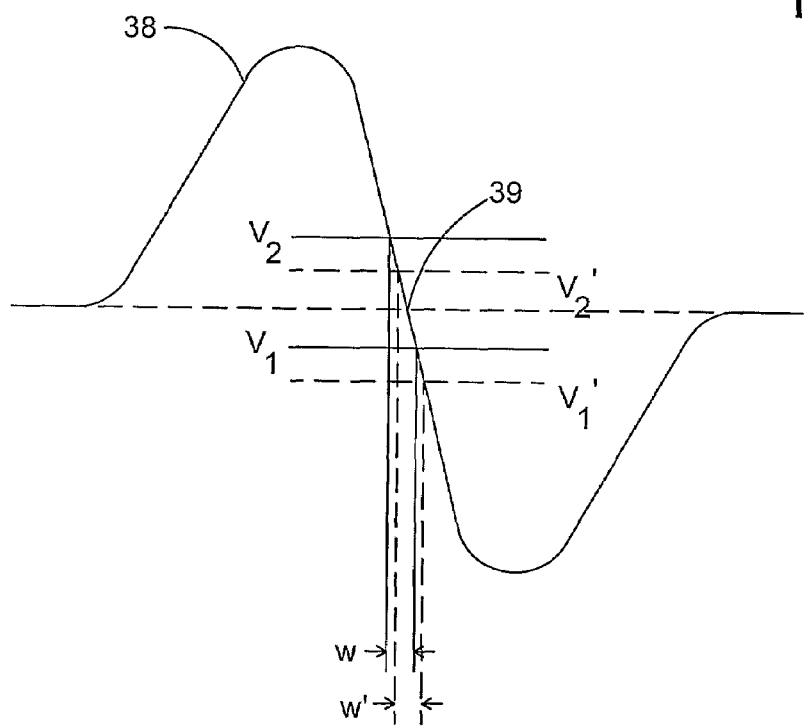
Figure 5:
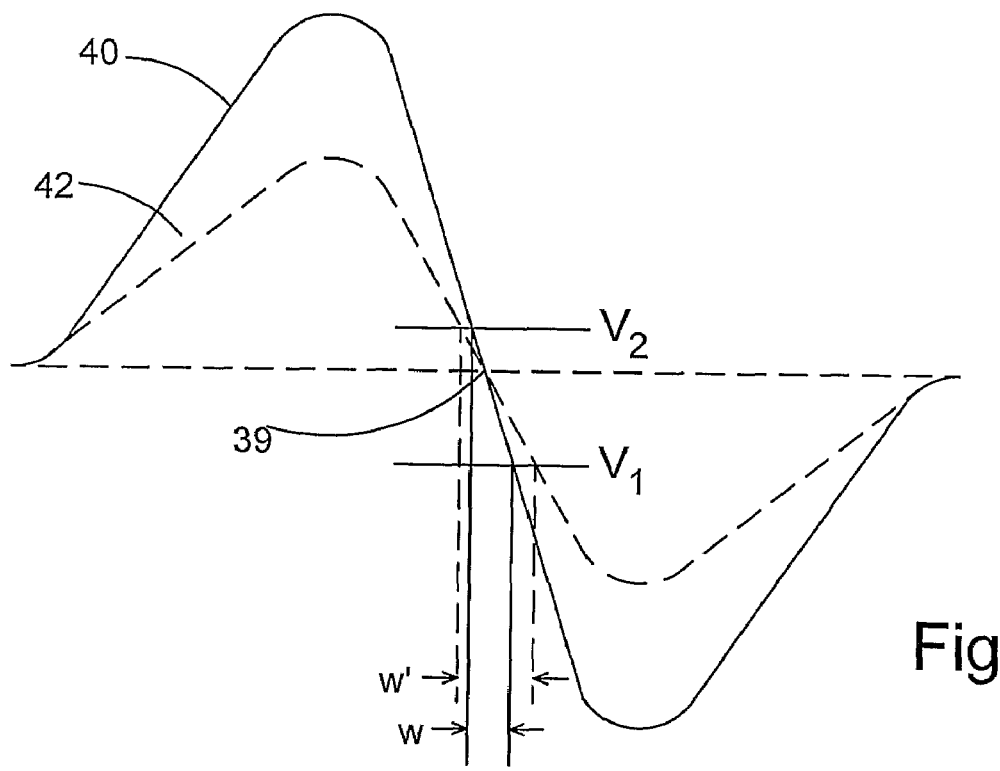
Figure 6:
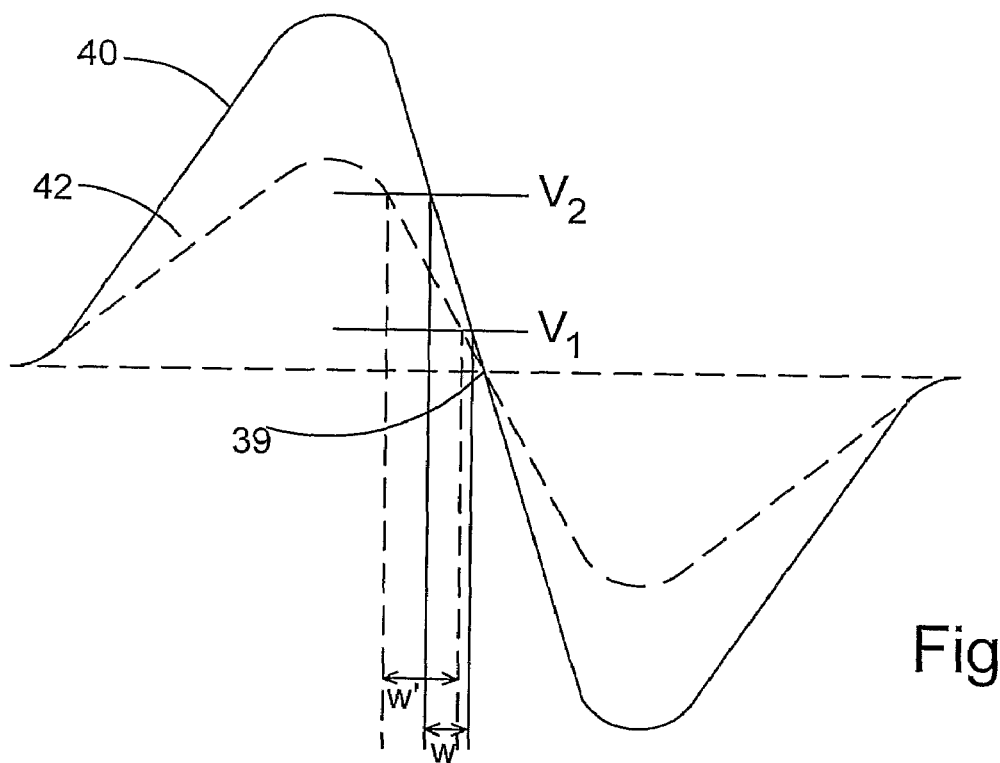
Figure 7:
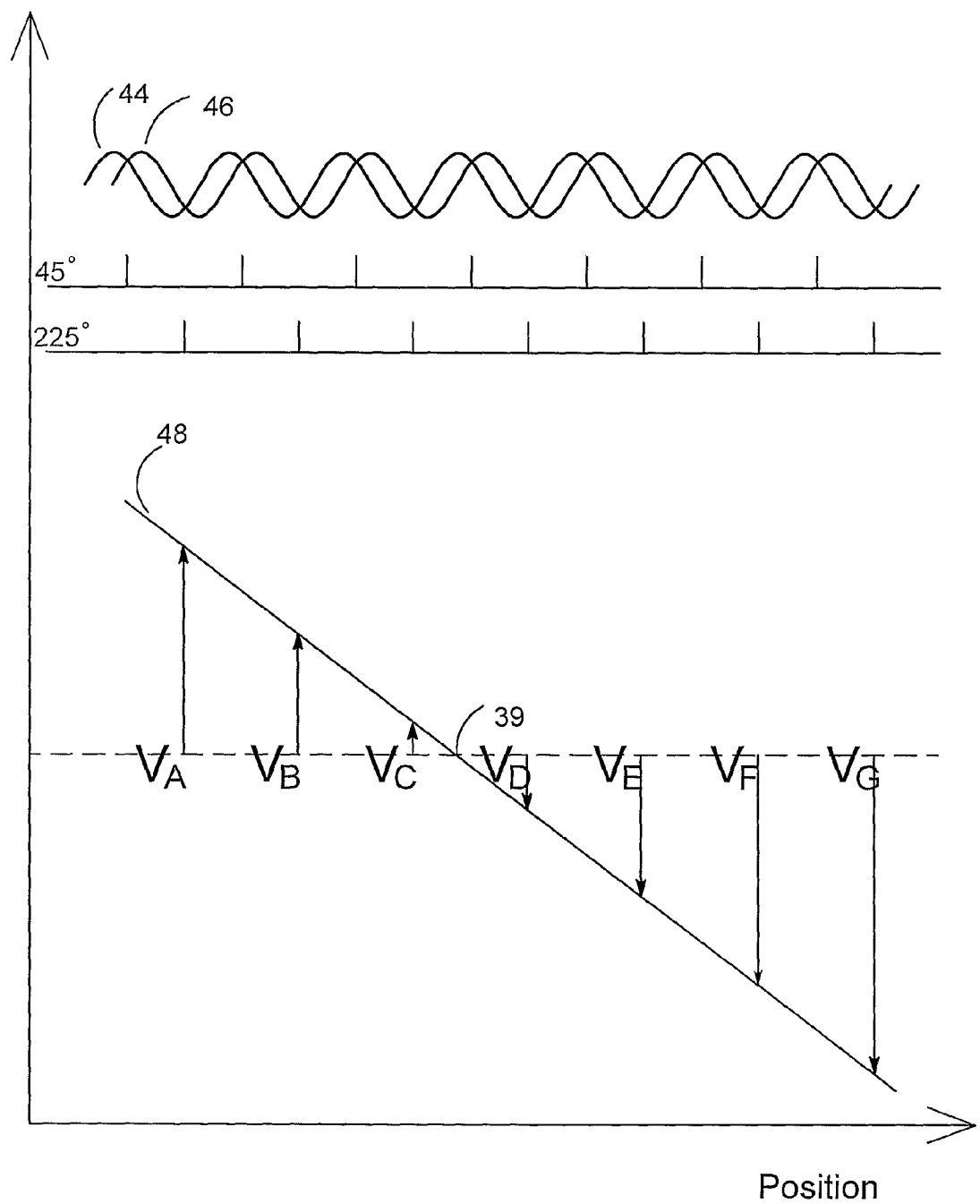
Figure 8:
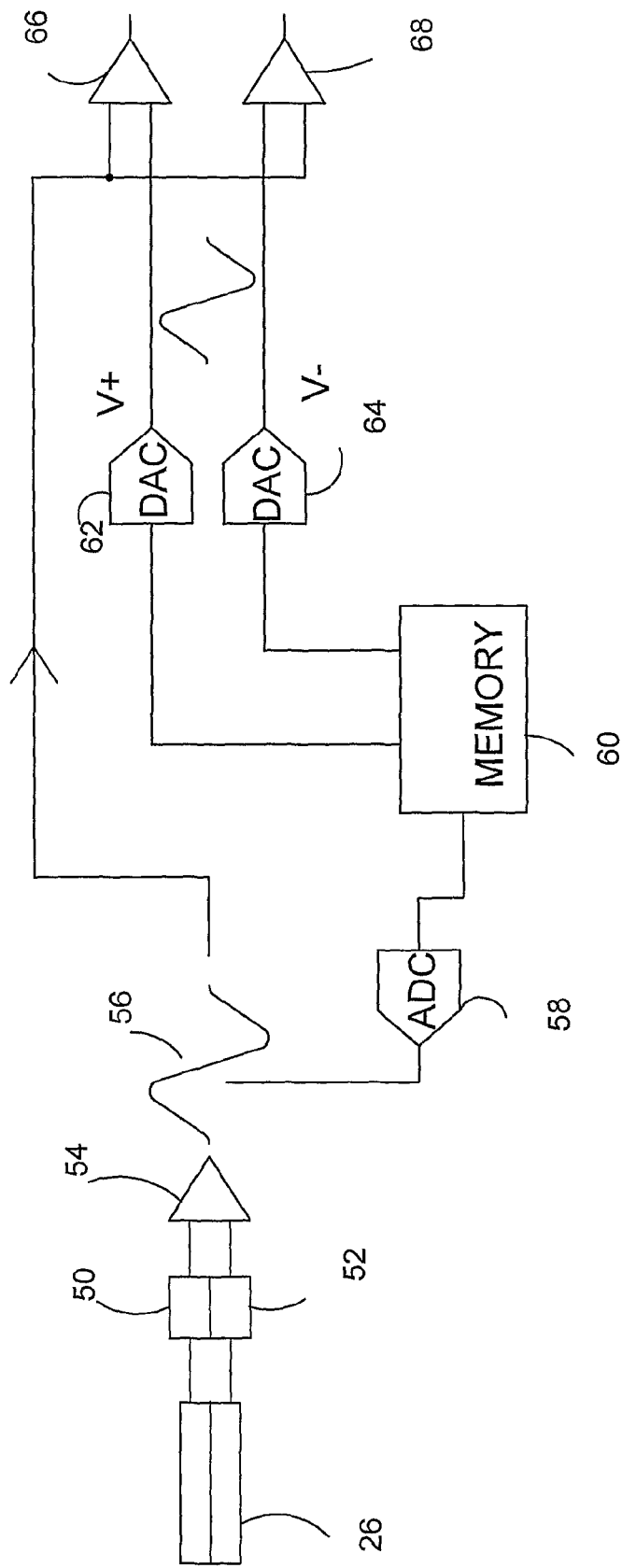

A second aspect of the present invention provides apparatus for calibrating a scale measurement apparatus comprising:
 a scale having scale markings arranged to form an incremental pattern and at least one scale mark;
 a readhead comprising an incremental detector means which produces an output signal and a scale mark detector means for producing a signal having a zero crossing;
 a logic controller capable of carrying out the following steps when the readhead is moved relative to the scale in any suitable order:
 (a) using the output from the incremental detector to determine a predetermined phase in the output signal;
 (b) using the output from the scale mark detector to determine the zero crossing;
 (c) determining the value of the signal from the scale mark detector corresponding to the predetermined phase in the output signal from the incremental detector on either side of the zero crossing; and
 (d) using the values determined in step (d) to define the width of the scale mark pulse Preferred embodiments of the invention will be illustrated by way of example and with reference to the accompanying drawings wherein:
 FIG. 1 is a plan view of a prior art scale;
 FIG. 2 is a side view of the reference mark optics used in the scale of FIG. 1;
 FIG. 3 illustrates a split detector and its output signals;
 FIG. 4 illustrates a difference signal with voltage thresholds;
 FIG. 5 illustrates two difference signals of different amplitudes with voltage thresholds;
 FIG. 6 illustrates two difference signals of different amplitudes with voltage thresholds which do not straddle the zero crossing;
 FIG. 7 illustrates the outputs of the incremental detector and the reference mark detector used in the present invention; and
 FIG. 8 is a circuit diagram suitable for the method of the present invention.

A known scale reading system is illustrated in FIG. 1. It comprises a scale 10 and readhead 12 movable relative to one another. The scale has two scale tracks, in a first scale track 14 it is provided with an incremental pattern which comprises a pattern of repeating light 16 and dark 18 lines. This is known as an amplitude scale. Other types of incremental scales are known, for example a phase scale which comprises a repeating pattern of lines of different depth.

A second scale track 20 is also provided. This scale track is a reference mark and is provided with a scale marking 22 which acts as a reference mark. The scale markings in the incremental scale typically have a pitch of 20 microns whereas the scale marking in the reference mark typically has a width of 200 microns.

Although in FIG. 1 the reference mark and incremental pattern are shown in separate tracks, it is possible for them to be provided in the same track. In this case the reference mark is embedded within the incremental scale track as disclosed in International Patent Application No. WO02/065061.

The readhead 12 is provided with an incremental detector system 24 to detect the incremental pattern and a reference mark detector system 26 to detect the reference mark. These systems may use a common or separate light sources. A suitable incremental detector system is disclosed in European Patent No. EP0543513.

FIG. 2 illustrates optics typically used to detect the reference marks. A light source 28 is provided in the readhead 12 to illuminate the scale 10. Light reflected by the scale 10 is focused by a lens 30 or other suitable optic onto a reference mark detector, such as a split detector or bi-cell 26. The reference mark may comprise a dark mark on a light background. In this case the reference mark detector will detect a reduction in light intensity as the readhead moves over the reference mark. Alternatively the reference mark may comprise a light mark over a dark background in which case the converse is true. Alternative optical schemes may be used to detect the reference mark.

FIG. 3 illustrates the split detector 26 and its output. As the readhead moves in the direction shown by arrow A relative to the scale and hence to the reference mark, light will fall first on one half K of the split detector and then on the other half J. The outputs 32,34 of the two halves K,J of the split detector 26 are offset from one another. These two outputs may be summed to produce a sum signal 36 or the difference taken to form a difference signal 38.

The sum signal 36 in FIG. 3 is typically used to gate the zero crossing point 39 of the difference signal. A sum signal 36 is compared to a fixed voltage threshold V and the signal above the threshold is used to determine the zero crossing point.

FIG. 4 illustrates a prior art method in which a reference mark signal is generated by comparing a difference signal 38 with two voltage thresholds $V_1, V_2$ near the crossing point 39. These voltage thresholds $V_1, V_2$ have a fixed distance between them. A reference mark signal is output when the voltage is between these threshold levels $V_1, V_2$.

When an optical measuring device is calibrated, the reference mark signal is phased with the incremental channel. This ensures that the centre of the reference mark signal is at a certain position with respect to incremental output and that the reference mark signal has a predefined width.

One method of calibrating the measurement apparatus is to geometrically adjust the readhead, which causes the incremental and reference mark channels to be realigned with respect to each other.

In another method of phasing the reference mark signal with respect to the incremental channel, the difference signal is adjusted electronically. Thus the difference signal is moved up and down relative to the voltage thresholds $V_1, V_2$ which define the reference mark switching points. In FIG. 4, a second set of voltage thresholds $V_1', V_2'$ are in a different position relative to the difference signal. The width of the reference mark signal W,W' between thresholds $V_1, V_2$ and $V_1', V_2'$ respectively stays substantially the same whilst its phase changes.

However, this method of aligning the reference mark signal with the incremental channel has several disadvantages. Non-optimal results are achieved if the amplitude of the difference signal varies. For example in open measurement systems different readhead and scale combinations are possible and this can result in different system gains. (i.e. the amplitude of the difference signal may vary when a readhead is used with different scale types). Some measurement systems use the same light source for the incremental and reference mark channels. In this case the incremental channel is calibrated first to obtain 100% signal strength following installation. This may cause the light levels falling on the split detector to change, hence changing the resultant amplitude of the difference signal.

FIG. 5 illustrates two difference signals 40,42 from a split detector, taken at different light amplitudes. The same voltage thresholds $V_1, V_2$ are used for both signals. It can be seen that the reference mark pulse has different widths W,W' for the two signals. Thus a fixed voltage spacing for the thresholds is not ideal in cases where the amplitude of the signal may vary.

To minimise the phase shift between the reference mark signal and the incremental signals with varying difference signal amplitude, the thresholds $V_1, V_2$ should be as close to the zero crossing point 39 as possible.

As illustrated in FIG. 6, threshold values $V_1$ and $V_2$ do not straddle the zero crossing of the difference signals 40,42, resulting in the reference mark pulses of widths W,W' for the different signal amplitudes 40,42 being phase shifted from one another.

The present invention provides a method of calibrating a reference mark signal with respect to the incremental channel without the disadvantages of the prior art methods.

FIG. 7 illustrates the outputs from the incremental channel and the difference signal from the reference mark split detectors. The output from the incremental channel comprises sine and cosine incremental signals 44,46. The output from the difference signal illustrated is the central portion of the difference signal 48 which can be treated as linear.

In this example it is desired to have a reference mark pulse which is 360° long and centered on 45° of the incremental channel. A 360° pulse centered on 45° starts at −135° and extends to 225°.

In the calibration method, the readhead is passed over a section of scale containing the reference mark and the outputs from the incremental and reference mark signals are monitored.

In a first step, the incremental sine/cosine signals are monitored. When the incremental sine/cosine signals are at 225° (this occurs when sine=cosine and both values are negative), the corresponding output from the difference signal is stored into memory. This is repeated every time the incremental signal is at 225°. Each time the difference signal (corresponding to 225° in the incremental channel) is stored, the previous stored signal is overwritten. When the zero crossing in the difference signal is detected, the previous voltage signal corresponding to 225° is not overwritten and the subsequent signal corresponding to 225° is stored. These two values are stored in memory and are subsequently used as the $V_1$ and $V_2$ thresholds. This produces a 360° wide pulse which is centered at 45° and straddles the zero crossing point of the difference signal. Thus in FIG. 7 the values $V_C$ and $V_D$ are used as the $V_1$ and $V_2$ thresholds.

Although FIG. 7 illustrates the zero crossing point having 0 V and the voltages $V_A$-$V_G$ having positive and negative voltages, in practice the voltages of the zero crossing point and $V_A$-$V_G$ are not necessarily zero, positive or negative but are constrained by the power supplies of the system.

This method also works if the direction of travel of the readhead relative to the scale is reversed. In this case the same two values for the thresholds will be chosen.

This method has the further advantage that calibration always produces a centered pulse of the desired width (360° in this example) irrespective of the scale pitch. This is unlike known methods which use voltage thresholds offsets that are signal pitch dependent. The method enables any centre and width of the reference mark pulse to be selected and is not limited to those in the example.

The calibration method is suitable for any reference mark detector which produces a difference signal, and is not limited to split detectors.

Any incremental system which produces a quadrature signal may be used. The quadrature signal is not limited to a part of sinusoidal waves, it could be made up of triangular waves for instance.

FIG. 8 illustrates a circuit diagram suitable for use in this method. The outputs from two halves of the split detector 26 are amplified by amplifiers 50,52 and the difference taken by amplifier 54 to form a difference signal 56. The signal is passed through an analogue to digital converter 58 and the signal stored in a memory 60 when they correspond to a particular value in the incremental output. As described above, two values in the memory straddling the zero crossing point are used as threshold values. These values are output from the memory to digital to analogue converters 62,64 where they form V+ and V−, i.e. voltage thresholds on the different signal. The V+ and V− thresholds are combined with the difference signal at comparators 66,68 to produce the reference mark signal.

The memory 60 and DACs 62,64 illustrated in the embodiment of FIG. 8 may be replaced by other suitable components, such as a non volatile electronic potentiometer ($E^2POT$). Components such as the ADC 58 in the embodiment of FIG. 8 may be provided in external set up equipment, rather than the readhead.

The reference mark calibration of the present invention may be carried out in a logic controller, for example a micro controller, micro sequencer or logic within a state machine.

Although the description and drawings relate to a reflective system, the invention is also suitable for a transmissive system.

This calibration method is suitable for linear, rotary and two-dimensional scales.

The calibration method is not limited to use with optical measurement systems. It is also suitable for non optical systems such as capacitance, inductance or magnetic measurement systems. Magnetic measurement systems may for example use differential Hall sensors or magneto resistance sensors to detect the difference signal. It is also suitable for different incremental and reference mark detector types, for example an optical incremental system and magnetic reference mark system etc.

The invention claimed is:

1. A method for calibrating a scale measurement apparatus, said scale apparatus comprising a scale having scale markings arranged to form an incremental pattern and at least one scale mark and wherein the readhead comprises an incremental detector means which produces an output signal and a scale mark detector means for producing a signal having a zero crossing, wherein the method comprises the following steps in any suitable order:
   (a) moving the readhead relative to the scale;
   (b) using the output from the incremental detector to determine a predetermined phase in the output signal;
   (c) using the output from the scale mark detector to determine the zero crossing;
   (d) determining the value of the signal from the scale mark detector corresponding to the predetermined phase in the output signal from the incremental detector on either side of the zero crossing; and
   (e) using the values determined in step (d) to define the width of the scale mark pulse.

2. A method according to claim 1 wherein the output signal from the incremental detector is a quadrature signal.

3. A method according to claim 2 wherein the phase of the predetermined phase is an angular position in each quadrature cycle.

4. A method according to claim 1 wherein the at least one scale mark is a reference mark.

5. A method according to claim 1 wherein the signal from the scale mark detector is a difference voltage signal.

6. A method according to claim 1 wherein the scale mark detector is a split detector.

7. A method according to claim 1 wherein the outputs from the scale mark detector which correspond to the predetermined phase in the output signal from the incremental detector are stored.

8. A method according to claim 7 wherein the outputs from the scale mark detector which correspond to the predetermined phase in the output signal from the incremental detector are stored in memory.

9. A method according to claim 7 wherein the previous output stored is overwritten by a subsequent output corresponding to the predetermined phase in the output signal from the incremental detector if no zero crossing is detected between the previous and subsequent outputs.

10. A method according to claim 7 wherein the previous output stored is not overwritten by a subsequent output corresponding to the predetermined phase in the output signal from the incremental detector if a zero crossing is detected between the previous and subsequent outputs.

11. A method according to claim 1 wherein the values determined in step (d) are used to define the centre of the scale mark pulse.

12. Apparatus for calibrating a scale measurement apparatus comprising:
   a scale having scale markings arranged to form an incremental pattern and at least one scale mark;
   a readhead comprising an incremental detector means which produces an output signal and a scale mark detector means for producing a signal having a zero crossing;
   a logic controller capable of carrying out the following steps when the readhead is moved relative to the scale, in any suitable order:
   (a) using the output from the incremental detector to determine a predetermined phase in the output signal;
   (b) using the output from the scale mark detector to determine the zero crossing;
   (c) determining the value of the signal from the scale mark detector corresponding to the predetermined phase in the output signal from the incremental detector on either side of the zero crossing; and
   (d) using the values determined in step (c) to define the width of the scale mark pulse.

* * * * *